Jan. 4, 1966  R. C. PRESSLEY, JR  3,227,802

ELECTRICAL DEVICE WITH SELF-STORING CORD ARRANGEMENT

Filed Oct. 21, 1963

INVENTOR.
ROBERT C. PRESSLEY JR.
BY James E. Espe
HIS ATTORNEY 3,227,802
ELECTRICAL DEVICE WITH SELF-STORING CORD ARRANGEMENT
Robert C. Pressley, Jr., Anchorage, Ky., assignor to General Electric Company, a corporation of New York
Filed Oct. 21, 1963, Ser. No. 317,609
2 Claims. (Cl. 174—52)

This invention relates to an arrangement for automatically storing the power cord of an electrically operated appliance when the appliance is not in use.

The problem of how to store the power cord for various electrical appliances when the appliances are not in use has long been a perplexing problem. A common prior art solution is to provide a pair of brackets on the exterior of the appliance casing about which the power cord may be manually wound. Other prior art devices have included complicated spring-operated reel arrangements to store the power cord. The first of these arrangements results in an unsightly coil of cord on the exterior of the appliance which may become easily tangled or accidentally knocked from the retaining brackets while the second is excessively expensive. By my invention a simple, inexpensive storing arrangement is provided which overcomes both these deficiencies of the prior art.

Therefore, an object of this invention is to provide an improved arrangement for storing the power cord of an electrically operated appliance.

Another object of this invention is to provide a simple, compact, economical and automatic cord storing arrangement.

Further objects and advantages of this invention will become apparent as the following description proceeds and the features of novelty which characterize this invention will be pointed out with particularity in the claims annexed to and forming a part of this specification.

In carrying out this invention, in one embodiment thereof, an electrical appliance, such as a dishwasher which includes the usual outer appearance cabinet, is provided with an elongated receptacle mounted adjacent one wall of the appearance cabinet. An opening, in the form of a keyhole slot, is provided in the cabinet adjacent one end of the receptacle. The power cord of the dishwasher extends through the elongated receptacle and is prestressed so that it will normally assume a helically coiled form in the receptacle when not in use. One end of the cord is connected to the electrical components of the appliance, and the other end extends through the opening in the cabinet and is provided with a plug for insertion into a usual convenience outlet. The plug is of sufficient size that it will bear against the wall of the cabinet adjacent the reduced portion of the keyhole slot to prevent the power cord from being completely retracted into the receptacle.

For a better understanding of this invention reference may be had to the accompanying drawing in which.

Figure 1:
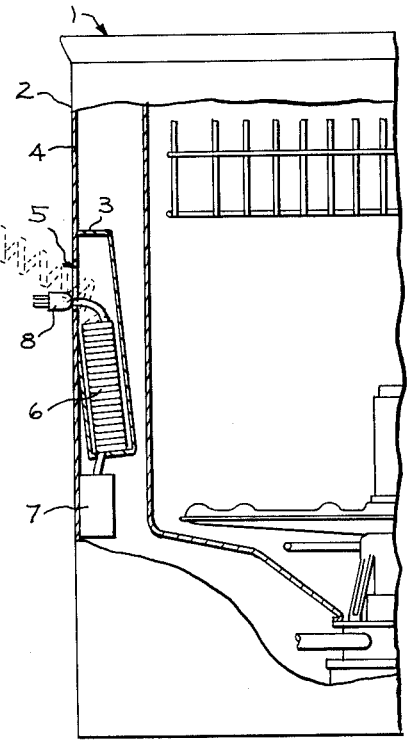
FIGURE 1 is a partial elevational view, partly broken away, of a dishwashing machine including one form of this invention.
Figure 2:
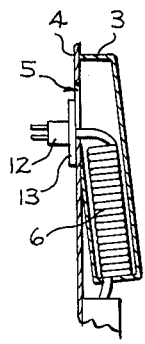
FIGURE 2 is a view of a portion of the appliance casing of FIGURE 1 illustrating a keyhole slot arrangement which may be utilized with this invention.

Referring now to FIGURE 1, there is shown an automatic dishwasher 1 which includes an outer appearance casing 2. A dishwasher is used only for purposes of illustration and this invention may be utilized with any of a number of other electrical appliances. Therefore, no detailed description of the structure of the dishwasher or its operation is included. An elongated receptacle 3 is mounted adjacent one wall 4 of the casing, and the wall 4 is provided with an opening 5 adjacent the upper end of the receptacle 3. An electrical power cord 6 is electrically connected at one end thereof to the electrical connection block 7 of the dishwasher and is received in the receptacle 3. The other end of the power cord 6 is provided with a connection plug 8 for insertion into a usual electrical convenience outlet.

When it is desired to operate the dishwasher, the cord 6 may be grasped by the plug 8 and at least a portion thereof removed from the receptacle 3 through the opening 5 so that the plug may be inserted in the convenience outlet. (The extended position of the power cord is illustrated in broken lines.) The power cord 6 is prestressed in a helically coiled manner. Therefore, when the plug 8 is removed from the convenience outlet, the cord will automatically retract through the opening 5 into the receptacle 3 and assume the position shown in solid lines in FIGURE 1.

To prevent the plug 8 from retracting into the casing 2 when released by the user, the opening 5 in the casing 4 is made in the form of a keyhole slot having an enlarged portion 10 and a reduced portion 11. The enlarged portion allows the cord 6 to be quickly and easily removed from or retracted into the receptacle 3 and casing 2, while the reduced portion 11 is of the proper size to fit about the cord 6. When the cord has been almost completely retracted into the casing, the user may insert the cord 6 into the reduced portion 11 and the plug 8 then bears against the wall 4 adjacent the reduced portion 11 and prevents the plug from being retracted into the casing 2.

Figure 3:
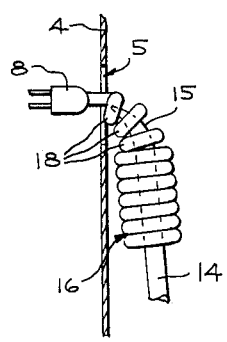
FIGURE 3 is a partial elevational view showing a modified form of the invention.

An alternative method of preventing the complete retraction of the cord 6 into the receptacle 3 is shown in FIGURE 3. The cord 6 is provided with a plug 12 which includes an enlarged flange 13. The diameter of the flange 13 is larger than the diameter of the opening 5 in the wall 4 of the casing 2. Therefore, when the plug 12 is disconnected from a convenience outlet and the cord 6 retracts into the casing 2 and receptacle 3, the flange 13 contacts the wall 4 adjacent the opening 5 and prevents the plug 12 from being retracted into the casing 2. Thus, the plug is readily available for the user to grasp the next time it is desired to operate the appliance. It will be obvious that the flange could be in the form of a separate washer type element mounted on the cord adjacent the plug rather than being formed integrally with the plug.

Figures 4, 5:
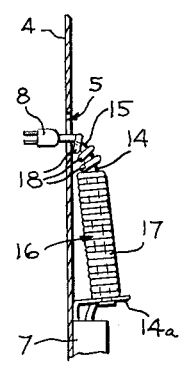
FIGURE 4 is a partial elevational view of another embodiment of this invention.
FIGURE 5 is an enlarged view of a portion of the embodiment illustrated in FIGURE 4.

Another form of this invention is illustrated by FIGURES 4 and 5. As may be seen in FIGURE 4 an elongated rod 14 is mounted near the wall 4 on a bracket 14a. The rod 14 includes an upper tapered portion 15 which curves toward the opening 5 in the wall 4 and terminates adjacent the opening (as may be best seen in FIGURE 5). A power cord 16 is provided with a uniformly coiled main portion 17 (coiled about the rod 14 with one end connected to the electrical connection block 7 of the appliance) while the other end is formed with loops 18 of decreasing diameter and a connection plug 8.

When it is desired to operate the appliance, the plug 8 is grasped by the user and pulled, removing the cord 16 from around the rod 14 and out through the opening 5 so that the plug 8 may be inserted in a convenience outlet. When the use of the appliance has been completed, the plug 8 is removed from the convenience outlet, the cord automatically retracts through opening 5 and coils around the elongated rod 14. The loops 18 of decreasing diameter come into contact with the tapered portion 15 of the rod and prevent the cord from being further retracted (this is best illustrated in FIGURE 5). Thus the plug remains on the exterior of the casing in position for easy grasping at the time of the next use of the appliance.

With any of the embodiments illustrated the power cord should be secured within the casing 2 to prevent the breaking of the connection between the cord and the connection block 7. This may be done in any conventional manner such as securing the cord either to the elongated receptacle 3 or the elongated rod 14 or by securing the cord to the connection block 7.

While in accordance with the patent statutes I have described that which at present is considered to be the preferred embodiment of this invention, it will be obvious to those skilled in the art that various changes and modifications may be made therein without departing from the invention, and I, therefore, intend the appended claims to cover all such changes and modifications as are within the true spirit and scope of the invention.

What I claim as new and desire to secure by Letters Patent of the United States is:

1. For use with an electrically powered device, a self-storing power cord arrangement comprising:
   (a) a casing for the device,
   (b) said casing having an opening therein,
   (c) a power cord having a first end extending through said opening and provided with a plug,
   (d) an elongated rod mounted within said casing and having a first end positioned near said opening for receiving said power cord in helically coiled form,
   (e) at least a portion of said cord being removable from said rod for connection to a convenience outlet,
   (f) said cord being prestressed in a helically coiled form for automatic retraction into a coiled position about said rod upon disconnection of said plug from the convenience outlet, and
   (g) a portion of said cord adjacent said plug having loops of decreasing diameter to contact said rod near said first end to thereby prevent retraction of said plug into said casing.

2. For use with an electrically powered device, a self-storing power cord arrangement comprising:
   (a) a casing for the device,
   (b) said casing having an opening therein,
   (c) a power cord having a first end extending through said opening and provided with a plug,
   (d) an elongated rod mounted within said casing and having a tapered end curved toward said opening and terminating near said opening,
   (e) at least a portion of said cord being removable from said rod for connection to a convenience outlet,
   (f) said cord being prestressed in a helically coiled form for automatic retraction into a coiled position about said rod upon disconnection of said plug from the convenience outlet, and
   (g) a portion of said cord adjacent said plug having loops of decreasing diameter to contact said tapered end of said rod to thereby prevent retraction of said plug into said casing.

References Cited by the Examiner
UNITED STATES PATENTS

| | | | |
|---|---|---|---|
| 1,681,378 | 8/1928 | Steinmayer | 174—162 X |
| 2,545,063 | 3/1951 | Wolfe | 174—47 X |
| 2,607,863 | 8/1952 | MacFarland | 174—69 X |
| 2,712,119 | 6/1955 | Strubel | 174—153 X |
| 2,860,197 | 11/1958 | Kost | 191—12 |
| 3,003,018 | 10/1961 | Cook | 174—69 |
| 3,092,134 | 6/1963 | Allen et al. | 174—135 X |

FOREIGN PATENTS 858,869   1/1961   Great Britain.

ROBERT K. SCHAEFER, *Primary Examiner.*

DARRELL L. CLAY, *Examiner.*